Sept. 24, 1957　　F. B. SALZMAN ET AL　　2,807,088
SHOE MEASURING DEVICE
Filed June 7, 1955　　　　　　　　　　　　3 Sheets-Sheet 1
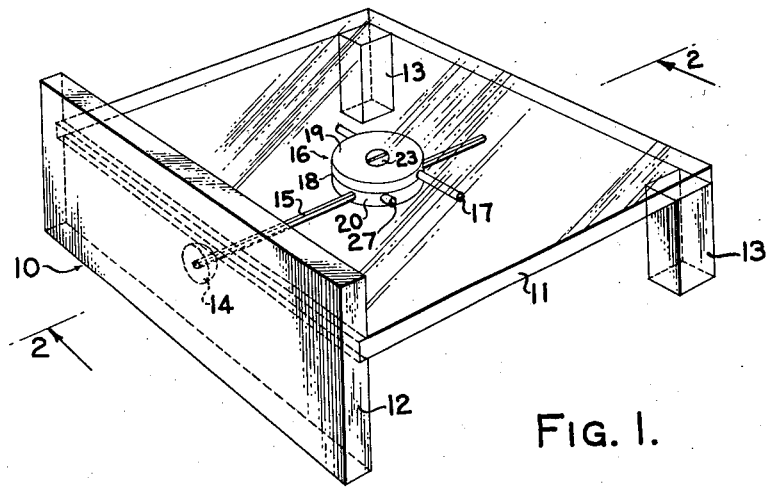
FIG. 1.
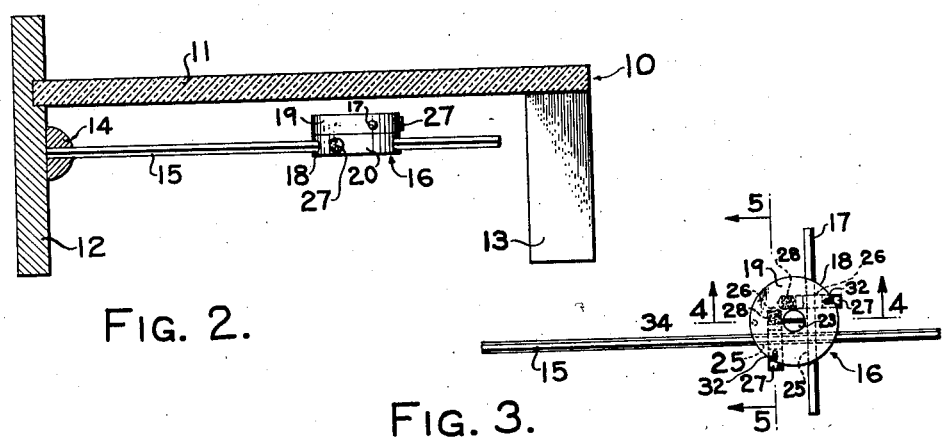
FIG. 2.
FIG. 3.
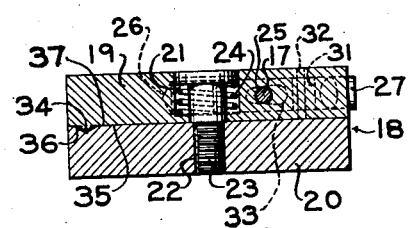
FIG. 4.
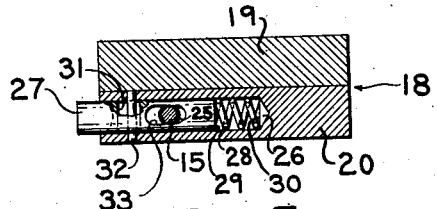
FIG. 5.
INVENTORS.
FRANK B. SALZMAN
NATHAN SALZMAN
BY
*S.B. Schlesse*
ATTORNEY Sept. 24, 1957    F. B. SALZMAN ET AL    2,807,088
SHOE MEASURING DEVICE Filed June 7, 1955    3 Sheets-Sheet 2

INVENTORS.
FRANK B. SALZMAN
NATHAN SALZMAN
BY
*S.B. Schlessel*
ATTORNEY

Sept. 24, 1957   F. B. SALZMAN ET AL   2,807,088
SHOE MEASURING DEVICE

Filed June 7, 1955   3 Sheets-Sheet 3

INVENTORS.
FRANK B. SALZMAN
NATHAN SALZMAN
BY S.B. Schlessel
ATTORNEY

United States Patent Office 2,807,088
Patented Sept. 24, 1957

2,807,088

SHOE MEASURING DEVICE

Frank B. Salzman, Brooklyn, and Nathan Salzman, Franklin Square, N. Y.

Application June 7, 1955, Serial No. 513,776

8 Claims. (Cl. 33—3)

This invention relates to shoe measuring devices and methods for using same to fit human feet, and has as its objective the provision of a shoe measuring device, together with the method of using said device, by means of which a human foot is measured simply yet scientifically in all of its necessary dimensions to fit it accurately with an appropriate shoe, not only with length and width measurements but also heel to ball of foot dimension, and by means of which the fit of the shoe can be rechecked instantly and visually.

In the past state of the art, in spite of a great number of measuring devices of assorted types used, the art of measuring a human foot and fitting it with a proper shoe has been far from accurate and has involved a certain amount of guesswork on the part of the fitter, aided by his past experiences. This is unfortunately so because of the fact that although a foot may be measured to a recognized scale of length and width sizes, it is well known that the shoe sizes and lasts among different shoe manufacturers are not identical, that even two pairs of shoes of the same size and width, manufactured by the same shoe company, are not identical, one pair being appreciably smaller than the other, and spelling out a difference between comfort and discomfort, protection and injury. When one considers that no two human feet are exactly alike, even though they measure the same in length and width, depending upon the toe lengths and the distance between the heel and the ball of the foot, one can readily appreciate the difficulty in fitting a particular foot with its appropriate shoe, and the many occasions when human feet, especially those of young children, have been and still are being permanently injured by improperly fitted shoes. While adults generally can subjectively assist the shoe fitter in arriving at a comfortable albeit improper shoe fit, the same is not true with young and inarticulate children and the danger of permanent foot injury is more likely in the latter case. Foot specialists have found that children can squeeze their feet into ill-fitting shoes and wear them for their daily rounds of school and play with no immediate pain or discomfort because of the softness and malleability of the young bones. The permanent bone damage and displacement as a result need no further comment.

One of the principal objects of our invention, therefore, is the provision of a shoe measuring device which scientifically and accurately measures a human foot, not only with respect to its length and width, but also with respect to the distance between the heel and the ball, or the widest part, of the foot.

Another important object of our invention is the provision of a shoe measuring device which can be inserted into a shoe to check the inner measurements thereof with respect to length, width and distance between heel and the widest part of the shoe to conform with the previously taken measurements of the foot in all such dimensions.

A third important object of our invention is the provision of a shoe measuring device which can be inserted into a shoe to check allowance of between ½ inch and ¾ inch space in length for clearance or "extension," as well as an appropriate width allowance of space.

A fourth important object of our invention is the provision of a shoe measuring device which is simple and expeditious to operate, and which can visually demonstrate to the fitter and the customer that the shoe is a proper fit on all points of measurement.

Still another important object of our invention is the provision of a method or technique by which measurement of the foot is secured scientifically and accurately on all points of measurement.

Other important objects, advantages and functional features of our invention, together with the features of construction, combination and arrangement of parts, will more readily appear from an examination of the following description, taken with the accompanying drawings, wherein:

Fig. 1 is a top perspective view of a preferred embodiment of our invention, including measuring platform and pedigage.

Fig. 2 is a vertical cross-sectional view, taken on lines 2—2 of Fig. 1;

Fig. 3 is a top view of the portion of our invention which we have called a "pedigage";

Fig. 4 is an enlarged, vertical cross-sectional view, taken on lines 4—4 of Fig. 3;

Fig. 5 is an enlarged vertical cross-sectional view, taken on lines 5—5 of Fig. 3;

Figure 15:
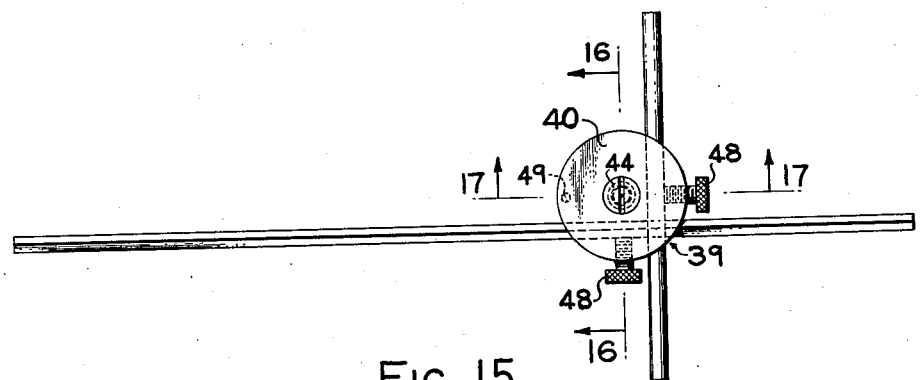
Figure 16:
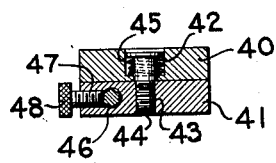
Figure 17:
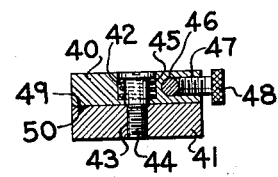
Figure 18:
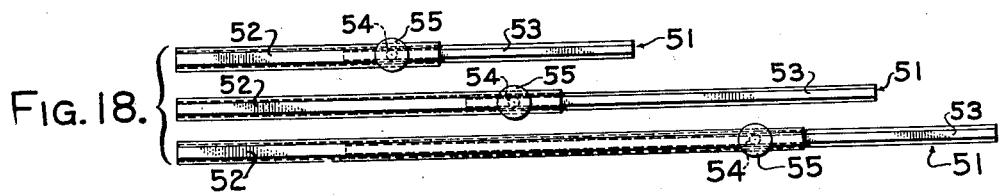

Figs. 6–14, inclusive, show diagrammatically the steps employed in our method of using the invention to fit the foot with an appropriate shoe;

Fig. 15 is an enlarged top view of a modified form of pedigage;

Fig. 16 is a vertical cross-sectional view, taken on lines 16—16 of Fig. 15;

Fig. 17 is a vertical cross-sectional view taken on lines 17—17 of Fig. 15;

Fig. 18 is a horizontal top view of a modified form of length gages; and

Figure 19:
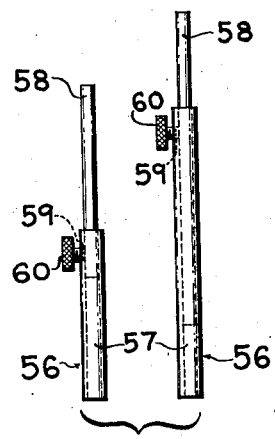

Fig. 19 is a vertical side view of a modified form of width gages.

Similar reference characters designate similar parts throughout the different views.

Illustrative of the embodiment shown by Figs. 1–5, inclusive, our invention comprises a fitting platform 10 comprising a transparent bench 11 supported on the one side by a wall 12, which is adapted to rise above the bench 11 and act as a backstop thereto, and supported on the other side by a pair of feet 13. The wall 12, below the bench 11 is provided with a collet 14 which is adapted to seat the length gage 15 of the pedigage or foot-measuring element 16, as shown and for the purpose to be hereinafter described.

The pedigage 16 comprises the combination of a length gage 15 and a width gage 17, which are secured together in a particular relationship by means of the gage-connecting clamp 18. The word "pedigage" is one we have coined to describe and define the over-all combination above described, which is the particular device by which measurement of a foot in length, width and dimension between the heel and ball of the foot is made, and which is inserted into a shoe to check the inner measurements thereof with respect to the measured foot.

As shown by Figs. 3, 4 and 5, the gage-connecting clamp 18 is composed of a pair of superimposed circular discs 19 and 20 provided with respective central bores 21 and 22, and secured together by means of a shoulder screw 23. The central bore 21 is enlarged in circumference in the upper part thereof, as shown, and adapted to receive a spiral tension spring 24 around the shoulder screw 23 within the disc 19 so as to hold discs 19 and 20 firmly together yet permit rotation of the discs 19 and 20 respective of each other and allow slight separation between the discs 19 and 20 for the purposes hereinafter to be shown. Each of the discs 19 and 20 is provided with a smooth bore 25 extending transversely through its body parallel with its flat surfaces and secant-wise relative to its circumference, and adapted to receive a length gage 15 or width gage 17 therethrough, as shown. Another smooth bore 26 is provided partially through each of the discs 19 and 20, and adapted to intersect the bore 25 at right angles thereto. A push button 27 is disposed fitted into the bore 26 in slidable engagement therewith, tensioned against a spiral spring 28 disposed between the end 29 of the push button 27 and the base 30 of the bore 26, to resist inward push on the button 27. The button 27 is provided with a perpendicular slot 31 through which it is secured to the disc (19 or 20) by means of a stud 32, permitting slidable movement of the button 27 into the bore 26 limited by the diameter of the perpendicular slot 31. The button 27 is further provided with a lateral tapered slot 33 adapted to come in registry with the bore 25 to permit the introduction of a length gage 15 or width gage 17 through the bore 25 and the slot 33 when the button 27 is pushed inwardly so that the larger portion of the slot 33 is in registry with the bore 25. When the button 27 is released, however, the spring 28 forces the button 27 outwardly, forcing the smaller area of the slot 33 into the bore 25 and against the length gage 15 or the width gage 17 located therein, locking the gage in position.

The disc 19 is further provided with a projection 34 extending downward from its undersurface 35 and adapted to come in registry with a recess 36 provided in the upper surface 37 of the disc 20, when the two discs 19 and 20 are rotated in respect to each other so that the bore 25 in the disc 19 is perpendicular to the bore 25 in the disc 20. In this position the length gage 15 and the width gage 17 are at right angles to each other, as shown in Fig. 3, and held firmly in place. With the exertion of some rotative pressure, and because of the spring arrangement of the shoulder screw 23, the discs 19 and 20 can be easily dislodged from this fixed position and freely rotated with respect to each other.

Figure 7:
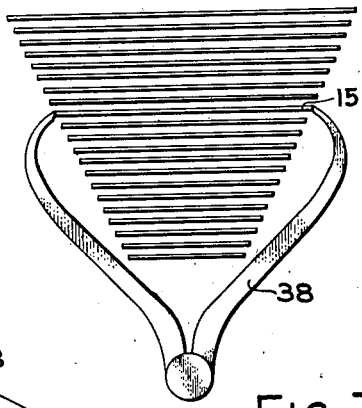
Figure 8:
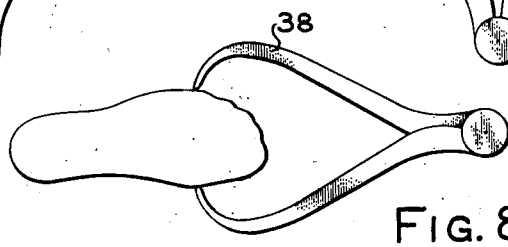
Figure 9:
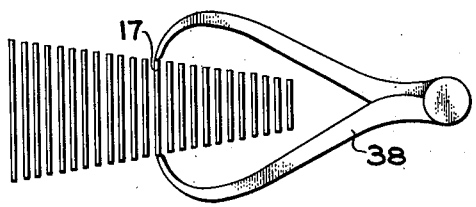
Figure 10:
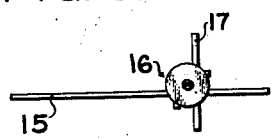
Figure 12:
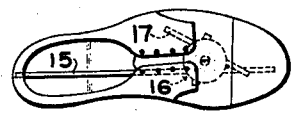

As shown by Fig. 7, the length gage 15 is one of a series of gages graduated in size to represent each of the length sizes for shoe fitting, running from baby 0 to men's size 14. As shown by Fig. 9, the width gage 17 is one of a series of graduated gages representing in length each of the width sizes in shoe fitting, ranging from baby size 0c to men's size 14 EEEE, as is well known in the art.

Figure 6:
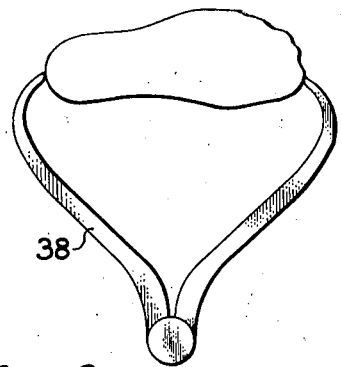

In the technique of measuring human feet for appropriate shoes by means of our invention, an outside caliper 38 (as shown in Figs. 6, 7, 8 and 9) is used, of a size to measure up to men's size 14. Under this technique or method of fitting we measure both of the customer's feet in a standing position by means of the caliper 38. The length measurement of each foot is taken, from toe to heel, as shown in Fig. 6, and the length gage 15 of equal measurement to the longer foot is selected from the series of graduated gages, shown by Fig. 7. This length gage 15 is then slipped into the bore 25 of disc 20 of the gage-connecting clamp 18 by first depressing and then releasing the push button 25. With the caliper 38 we then measure both feet in standing position for width. We find the widest measurement of the widest foot, and then the width gage 17 of equal measurement is selected from the graduated series (as shown by Fig. 9) and similarly inserted into bore 25 of disc 19 of the gage-connecting clamp 18. The combination of length gage 15 and width gage 17 in the clamp 18 completes the pedigage 16.

Figure 11:
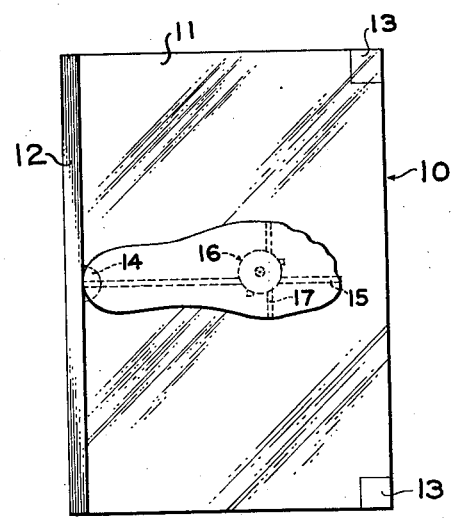
Figure 13:
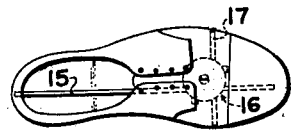

The customer then stands upon the fitting platform 10 with the heels of both feet flush against the backstop created by the wall 12, the heel of the wider foot directly above the collet 14. The pedigage 16 is then secured to the collet 14 by insertion of the end of the length gage 15 into the collet 14 until it touches the wall 12, as shown by Fig. 11, beneath the transparent bench 11. The wider foot of the customer is thus lined up parallel to the length gage 15 of the pedigage 16. By depressing the push button 27 holding the clamp 18 to the length gage 15 the clamp 18 carrying the width gage 17 is then slid along the length gage 15 until the width gage 17 is directly lined up with the ball, or widest part, of the foot, and then locked in that position, perpendicular to the length gage 15. By depressing the push button 27 holding the width gage 17 to the disc 19, the width gage 17 is released and then adjusted laterally until its ends are flush with the edges of the widest part, or ball, of the foot, and then locked in that position by release of the push button 27.

The desired style of shoe is then selected, having length and width size corresponding to that of the pedigage 16. The width gage 17 is then rotated with its disc 19 to an acute angle to the length gage 15, and the pedigage 16 is inserted into the shoe thus selected, with the outer end of the length gage 15 flush with the heel of the shoe. The width gage 17 is then rotated until it locks freely perpendicular to the length gage 15. If the shoe is too narrow the width gage 17 will not lock freely perpendicular to the length gage 15. If the shoe is too wide the width gage 17 will move laterally within the shoe when locked perpendicular to the length gage 15. However, if the width of the shoe is a proper one the width gage will fit in the widest part of the shoe with the proper amount of tolerance.

Figure 14:

With respect to checking the proper length of the shoe, the pedigage 16, with the width gage 17 at an acute angle to the length gage 15 is inserted into the shoe, in the same manner as the length gage 15 alone as shown in Fig. 14. The forward end of the length gage 15 will touch the inner tip of the shoe and show a spacing of between ½ inch and ¾ inch between the back end of the length gage 15 and the heel of the shoe, for a proper fit, to allow space allowance or "extension" for growth and to prevent pressure on the big toe. A larger spacing or lesser spacing shows that the shoe is not a proper fit, and a shorter or longer shoe, respectively, should be selected.

A very important feature of our invention and technique lies in the fact that the fitter and the customer both can see the pedigage 16 as it lies in the shoe, representing the foot in all critical dimensions, to verify the suitability of the shoe for the foot of the customer, and removing all doubt as to a proper fit.

The length gages 15, as shown in Fig. 7, are to be marked with the corresponding size in the table of sizes ranging from baby 0 to men's 14, to facilitate selection of the proper size of shoe from stock. However, since the widths vary, depending upon the length of the foot, i. e., a width "C" in size "8" may be a width "B" in a size "10," it is not practical to calibrate the width gages 17. The insertion of the pedigage 16 into the shoe will readily demonstrate the appropriate width.

By application of the above technique with our invention we can accurately and scientifically ascertain all three critical foot dimensions, i. e. the length, width, and heel to ball length, and thus fit the foot with exactitude. Our invention likewise enables the customer to see for himself that the shoe is properly fitted to his foot, since, before trying on the shoe, he sees the exact position of the pedigage 16 in the shoe. Most important, however, our invention guarantees an accurate fitting of shoes for younger children who otherwise, because of inability to express themselves, might be fitted with shoes that could injure their feet permanently.

In Figs. 15, 16 and 17 there is shown a modified embodiment 39 of the gage-connecting clamp 18. It comprises an upper circular disc 40 and a lower circular disc 41, superposed and secured together through central openings 42 and 43 by means of a shoulder screw 44 and spiral spring 45 in the same manner as described with respect to clamp 18. The discs 40 and 41 are each provided with a smooth bore 46 similar to the bores 25 of clamp 18 and adapted to contain a gage 15 or 17, and a transverse bore 47 intersecting bore 46 at right angles thereto. Each of the bores 47 is threaded and adapted to receive a set screw 48 disposed to enter the bore 47 and contact the gage 15 or 17 located within the bore 46, to hold said gage firmly in position. The disc 40 and 41 are likewise provided respectively with projection 49 and recess 50, similar to projection 34 and recess 36 on discs 19 and 20, and operative in the same fashion.

In Figs. 18 and 19 there are shown modified embodiments of the length gages 15 and width gages 17. Instead of a graduated series of each type of gage, the length gage 15 can be provided in three graduated sizes to encompass all lengths from 0 to men's 14. Each gage 15 comprises a hollow cylinder 52 in which is telescoped a rod 53, calibrated as to length sizes and adapted to be extended or compressed into the cylinder 52 to the prescribed size, and locked in that position by tightening of the set screw 55 which is threaded into the opening 54 of the cylinder 52. Similarly, the width gages 56, as shown in Fig. 19, comprise two gages which can encompass all widths from baby 0c to men's 14 EEEE. They each consist of a hollow cylinder 57 in which is slidably telescoped a rod 58 adapted to be secured in varying extensions by means of a set screw 60 threaded through the opening 59 in the cylinder 57.

The embodiments shown and described are by way of illustration only, and various changes may be made in the construction and arrangement of parts, as well as substitution of equivalents, without limitation upon or departure from the spirit and scope of our invention, or sacrificing any of the advantages thereof inherent therein, as limited by the appended claims.

Having described our invention, we claim;

1. A shoe measuring device comprising in combination a measuring platform, an outside caliper and a pedigage, the platform provided with a transparent bench and a backstop extending upwardly from the bench, means disposed below the bench to receive and removably retain a pedigage parallel to the bench, the pedigage comprising a pair of measuring gages, means to secure the gages together, means to rotate the gages relative to each other, means to slidably adjust the gages relative to each other, means to lock the gages in selected positions, and means to lock the gages in perpendicular relationship to each other in parallel planes.

2. A shoe measuring device comprising in combination a measuring platform, an outside caliper and a pedigage, the platform provided with a transparent bench and a backstop extending therefrom perpendicular thereto, means disposed below the bench adapted to removably receive and retain the pedigage parallel to the bench, the pedigage comprising a pair of measuring gages and a gage-connecting clamp, the clamp provided with means to receive the gages, means to rotate the gages relative to each other, means to slidably move the gages relative to each other, means to lock the gages in selected positions, and means to lock the gages at right angles to each other in parallel planes.

3. A shoe measuring device comprising in combination a measuring platform, an outside caliper and a pedigage, the platform comprising a transparent bench provided with a backstop extending above the plane of the bench, and a collet disposed below the bench adapted to removably receive and retain the pedigage parallel to the bench, the pedigage comprising a pair of selected measuring gages and a gage-connecting clamp, the clamp comprising a pair of superposed cylindrical discs centrally secured in rotatable engagement, means within each of the discs to receive and retain a measuring gage, means to selectively move the measuring gages relative to each other, means to selectively lock the measuring gages in selected position, and means to lock the discs with the gages in perpendicular relationship to each other in parallel planes.

4. A shoe measuring device comprising in combination a measuring platform, an outside caliper, a series of graduated length and width measuring gages and a gage-connecting means, the platform provided with a transparent bench and a back-stop extending upwardly from the bench, and means disposed below the bench to receive and removably retain a selected length gage secured to the gage-connecting means, the gage-connecting means comprising a pair of superposed members centrally secured in rotatable engagement with each other, means within each of the members to receive a measuring gage, means to selectively move the measuring gages relative to each other, and means to lock the measuring gages at right angles to each other in parallel planes.

5. As a foot measuring element a pedigage comprising a pair of measuring gages and a gage-connecting clamp, the gage-connecting clamp comprising a pair of superposed members centrally secured in rotatable engagement, means within each of the members to receive a selected measuring gage, means to selectively move the measuring gages relative to each other, means to lock the measuring gages in selected positions, means to rotate the gages in parallel planes, and means to lock the gages at right angles to each other in parallel planes.

6. A foot measuring element comprising a gage-connecting clamp and a series of graduated length and width gages, the gage-connecting clamp comprising a pair of superposed members centrally secured in rotatable engagement, means within each of the members to receive a selected measuring gage, means to selectively move the measuring gages relative to each other, means to lock the measuring gages in selected positions, means to rotate the gages in parallel planes, and means to lock the measuring gages at right angles to each other in parallel planes, the combination of gage-connecting clamp and a pair of measuring gages constituting a pedigage.

7. A shoe measuring device, according to claim 5, the measuring gages comprising each a hollow cylinder and a central rod slidable with respect to the cylinder, and means to lock the rod to the cylinder at selected extensions of the rod.

8. A shoe measuring device, according to claim 4, the measuring gages comprising each a hollow cylinder and a central rod slidable with respect to the cylinder, and means to lock the rod to the cylinder at selected extensions of the rod.

References Cited in the file of this patent

UNITED STATES PATENTS

| | | |
|---|---|---|
| 655,228 | Hatfield | Aug. 7, 1900 |
| 2,605,548 | Clarke | Aug. 5, 1952 |
| 2,672,688 | Crandall et al. | Mar. 22, 1954 |
| 2,696,051 | Perman et al. | Dec. 7, 1954 |
| 2,706,856 | Cwiak et al. | Apr. 26, 1955 |
| 2,784,492 | San Fratello | Mar. 12, 1957 |